(12) United States Patent
Kato

(10) Patent No.: US 10,664,082 B2
(45) Date of Patent: May 26, 2020

(54) DISPLAY DEVICE

(71) Applicant: Japan Display Inc., Tokyo (JP)

(72) Inventor: Kengo Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/101,804

(22) Filed: Aug. 13, 2018

(65) Prior Publication Data

US 2019/0073073 A1    Mar. 7, 2019

(30) Foreign Application Priority Data

Sep. 5, 2017    (JP) .................................. 2017-170599

(51) Int. Cl.
| | |
|---|---|
| *G06F 3/041* | (2006.01) |
| *G02B 5/30* | (2006.01) |
| *G06F 1/16* | (2006.01) |
| *G06F 3/047* | (2006.01) |

(52) U.S. Cl.
CPC ......... *G06F 3/0412* (2013.01); *G02B 5/3025* (2013.01); *G06F 1/1643* (2013.01); *G06F 1/1652* (2013.01); *G06F 3/047* (2013.01); *G06F 2203/04102* (2013.01); *G09G 2310/0264* (2013.01)

(58) Field of Classification Search
CPC ...... G06F 3/0412; G06F 1/1643; G06F 3/047; G02B 5/3025; G09G 2310/0264
See application file for complete search history.

(56) References Cited

U.S. PATENT DOCUMENTS

| | | | | |
|---|---|---|---|---|
| 9,259,895 | B2 * | 2/2016 | Park ......................... | B32B 9/04 |
| 2010/0271329 | A1 * | 10/2010 | Oohira ................ | G02F 1/13338 |
| | | | | 345/174 |
| 2011/0261021 | A1 * | 10/2011 | Modarres ................ | G06F 3/016 |
| | | | | 345/177 |
| 2013/0100053 | A1 * | 4/2013 | Kang ........................ | G06F 3/03 |
| | | | | 345/173 |
| 2014/0042406 | A1 * | 2/2014 | Degner ................. | H01L 27/326 |
| | | | | 257/40 |
| 2014/0217373 | A1 * | 8/2014 | Youn ................... | H01L 23/4985 |
| | | | | 257/40 |
| 2014/0321074 | A1 * | 10/2014 | Chida ..................... | H05K 7/14 |
| | | | | 361/749 |

(Continued)

FOREIGN PATENT DOCUMENTS

| | | |
|---|---|---|
| JP | 2010-96918 A | 4/2010 |
| JP | 2010-181581 A | 8/2010 |
| JP | 2013-242395 A | 12/2013 |

*Primary Examiner* — Sejoon Ahn
(74) *Attorney, Agent, or Firm* — Michael Best & Friedrich LLP

(57) ABSTRACT

Disclosed is a display device having a substrate, a pixel located over the substrate and including a display element, a touch sensor over the pixel through a first adhesive film, a polarizing plate over the touch sensor, and a sealing material covering a side surface of the polarizing plate and at least one of a part of a top surface and a part of an undersurface of the polarizing plate. The sealing material may further cover a side surface of the touch sensor. The sealing material may have a moisture permeability of equal to or larger than 30 g/m²·24 h and equal to or smaller than 80 g/m²·24 h at a temperature of 40° C. and at a humidity of 90%.

7 Claims, 13 Drawing Sheets

(56) References Cited

U.S. PATENT DOCUMENTS

| | | | |
|---|---|---|---|
| 2016/0313769 A1* | 10/2016 | Yoshitani | G04G 17/045 |
| 2017/0005157 A1* | 1/2017 | Yim | H01L 33/60 |
| 2017/0005158 A1* | 1/2017 | Yeo | H01L 51/56 |
| 2017/0005273 A1* | 1/2017 | Hwang | C09K 11/06 |
| 2017/0005286 A1* | 1/2017 | Yun | H01L 27/3211 |
| 2017/0192596 A1* | 7/2017 | Lee | G01L 1/146 |

\* cited by examiner

DISPLAY DEVICE

CROSS REFERENCE TO RELATED APPLICATIONS

This application is based on and claims the benefit of priority from the prior Japanese Patent Application No. 2017-170599, filed on Sep. 5, 2017, the entire contents of which are incorporated herein by reference.

FIELD

An embodiment of the present invention relates to a display device. For example, an embodiment of the present invention relates to a display device having a light-emitting element formed over a flexible substrate.

BACKGROUND

A liquid crystal display device and an organic EL (Electroluminescence) display device are represented as an example of a display device. These display devices possess a liquid crystal element or an organic light-emitting element (hereinafter, referred to as a light-emitting element) as a display element in each of a plurality of pixels formed over a substrate. A polarizing plate is disposed over the plurality of pixels to control orientation of light from the display element or suppress reflection of ambient light. A polarizing plate usually includes a poly(vinyl alcohol)-based polymer having a main chain oriented in one direction and iodine or a dichroic dye adsorbed thereto as a fundamental structure. A poly(vinyl alcohol)-based polymer readily adsorbs external water due to its high hydrophilicity. If water enters a polarizing plate, a dye or iodine is partly lost due to the water or impurities included in the water, which causes diminution of the function as a polarizing plate. Thus, Japanese Patent Application Publications No. 2010-96918, 2010-181581, and 2013-242395 disclose formation of a sealing material at an edge portion of a polarizing plate as a method for preventing entrance of water to a polarizing plate.

SUMMARY

An embodiment of the present invention is a display device. The display device possesses a substrate, a pixel located over the substrate and including a display element, a touch sensor over the pixel through a first adhesive film, a polarizing plate over the touch sensor, and a sealing material covering a side surface of the polarizing plate and at least one of a part of a top surface and a part of an undersurface of the polarizing plate.

An embodiment of the present invention is a display device. The display device possesses a substrate, a pixel located over the substrate and including a display element, a touch sensor over the pixel through a first adhesive film, a polarizing plate over the touch sensor, a terminal located over the substrate and electrically connected to the pixel, a connector covering and electrically connected to the terminal; and a sealing material covering a side surface of the first adhesive film and a part of a top surface of the connector.

An embodiment of the present invention is a display device. The display device possesses a substrate, a pixel located over the substrate and including a display element, a touch sensor over the pixel through a first adhesive film, and a polarizing plate over the touch sensor. The first adhesive film covers a side surface of the touch sensor and a side surface of the polarizing plate.

An embodiment of the present invention is a display device. The display device possesses a substrate, a pixel located over the substrate and including a display element, a terminal located over the substrate and electrically connected to the pixel through a wiring, a touch sensor over the pixel through a first adhesive film, a polarizing plate over the touch sensor, an opposing substrate over the polarizing plate, and a sealing material covering a side surface of the polarizing plate. The substrate is bent in a region overlapping with the wiring so that the pixel is located between the terminal and the opposing substrate. The sealing material covers at least a part of the region.

DESCRIPTION OF EMBODIMENTS

Hereinafter, the embodiments of the present invention are explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the present specification and claims, when a plurality of films is formed by processing one film, the plurality of films may have functions or roles different from each other. However, the plurality of films originates from a film formed as the same layer in the same process and has the same layer structure and the same material. Therefore, the plurality of films is defined as films existing in the same layer.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the present specification and claims, an expression "a structural body is exposed from another structural body" means an aspect where a portion of the structural body is not covered by the other structural body and includes an aspect where the portion which is not covered by the other structural body is covered by yet another structural body.

First Embodiment

A structure of a display device 100 according to an embodiment of the present invention is explained below.

1. Outline Structure

Figure 1A:
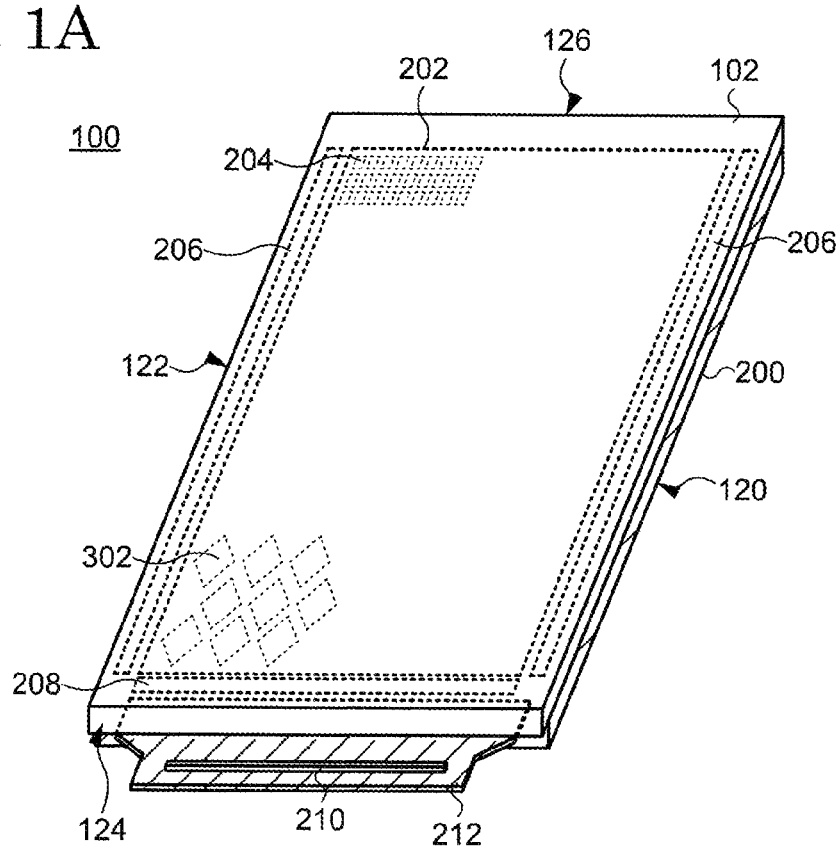
FIG. 1A and FIG. 1B are schematic perspective views of a display device according to an embodiment.

A schematic perspective view of the display device 100 is shown in FIG. 1A. The display device 100 possesses a display panel 200 and an opposing substrate 102 located over the display panel 200 and covering at least a part of the display panel 200. As described below, the display panel 200 has a substrate 222, a display layer 216 formed over the substrate 222 and providing a display function, a touch sensor over the display layer 216, a polarizing plate 320 over the touch sensor 300, and the like.

A variety of insulating films, semiconductor films, and insulating films is stacked in the display layer 216 and appropriately patterned and connected, by which a plurality of pixels 204, scanning-line driver circuits 206, a signal-line driver circuit 208, and the like are fabricated. A region in which the plurality of pixels 204 is formed is a display region 202, and a region other than the display region 202 is called a frame region. Wirings (wirings such as a wiring 288 in FIG. 7) which are not illustrated extend from the display region 202, the scanning-line driver circuits 206, and the signal-line driver circuit 208 to a side (third side 124) of the substrate 222 and are connected to a connector 212 such as a flexible printed substrate circuit (FPC). The display device 100 may further possess a driving IC 210 including an integrated circuit formed over a semiconductor substrate. The driver circuit 210 may be mounted over the connector 212 as shown in FIG. 1A or may be mounted over the substrate 222 so as to be covered by the opposing substrate 102. Image signals supplied from an external circuit (not shown) are converted by the driver IC 210 to generate signals for display, and the signals for display are supplied to the scanning-line driver circuits 206 and the signal-line driver circuit 208 through the connector 212. Signals corresponding to an image are provided to each pixel 204 from the scanning-line driver circuits 206 and the signal-line driver circuit 208, by which the pixels 204 are controlled and an image is displayed on the display region 202.

Figure 1B:
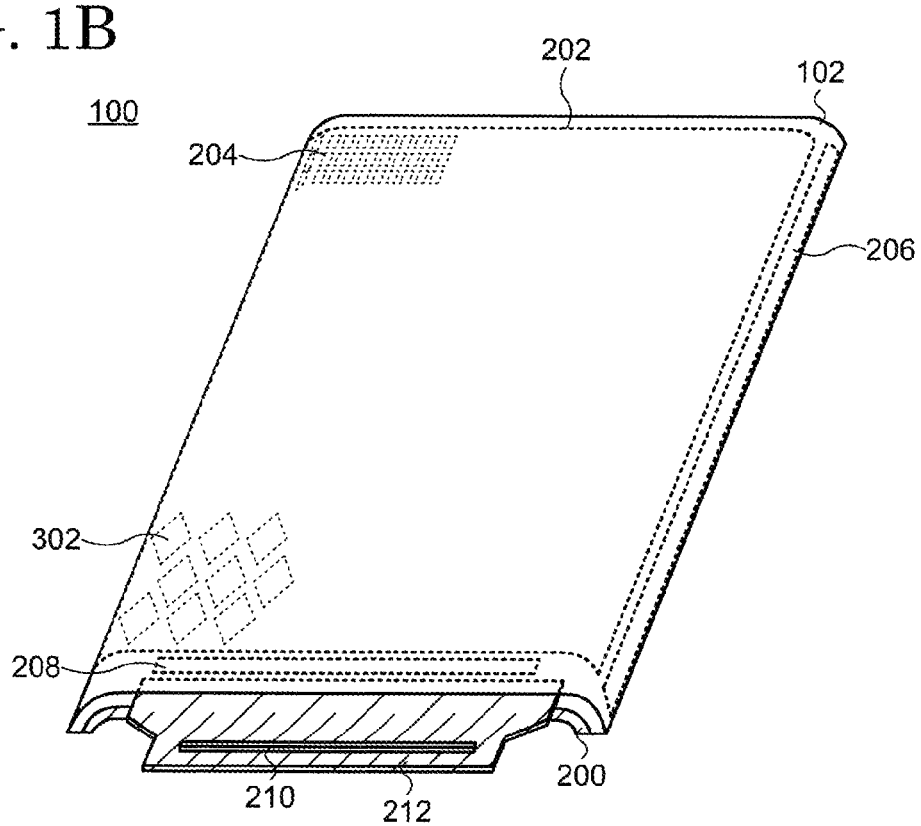

The opposing substrate 102 is disposed in order to provide physical strength to the display device 100 as well as to transmit light from the display panel 200 so that the light is supplied as an image. The opposing substrate 102 contains glass, quartz, or a polymer such as a polyamide and a polyimide and may have flexibility or rigidity which does not permit the opposing substrate 102 to be readily bent. The opposing substrate 102 may have a flat shape shown in FIG. 1A, or an edge portion thereof may be bent as shown in FIG. 1B. In the latter case, the use of the substrate 222 with flexibility allows an edge portion of the display panel 200 to be bent to match the shape of the opposing substrate 102, by which the display device 100 is able to have a configuration in which the bent portion of the substrate 222 and the bent portion of the opposing substrate 102 overlap with each other. As shown in FIG. 1B, when the display device 100 is provided with the shape in which the frame region overlapping with the scanning-line driver circuits 206 is bent, an apparent area of the frame region is decreased and a display device with excellent designability can be produced. In contrast, when a flexible substrate is used for both the opposing substrate 102 and the substrate 222, the display device 100 with flexibility can be provided.

As described below, the touch sensor 300 has a plurality of touch electrodes 302 and provides the display device 100 with a function as an interface used when a user inputs information to the display device 100.

The shape of the display device 100 is not limited. When the display device 100 has a rectangular or substantially rectangular shape as shown in FIG. 1A and FIG. 1B, a side along which the scanning-line driver circuit 206 extends is defined as a first side 120, and a side opposing the first side 120 with the display region 202 sandwiched therebetween is defined as a second side 122. A side over which the connector 212 is disposed is defined as a third side 124, and a side opposing the third side 124 with the display region 202 sandwiched therebetween is defined as a fourth side 126. Although the first side 120 and the second side 122 are long sides in the examples demonstrated in FIG. 1A and FIG. 1B, these sides may be short sides, and the third side 124 and the fourth side 126 may be long sides.

2. Structure of Pixel 2-1. Display Layer

Figure 2:
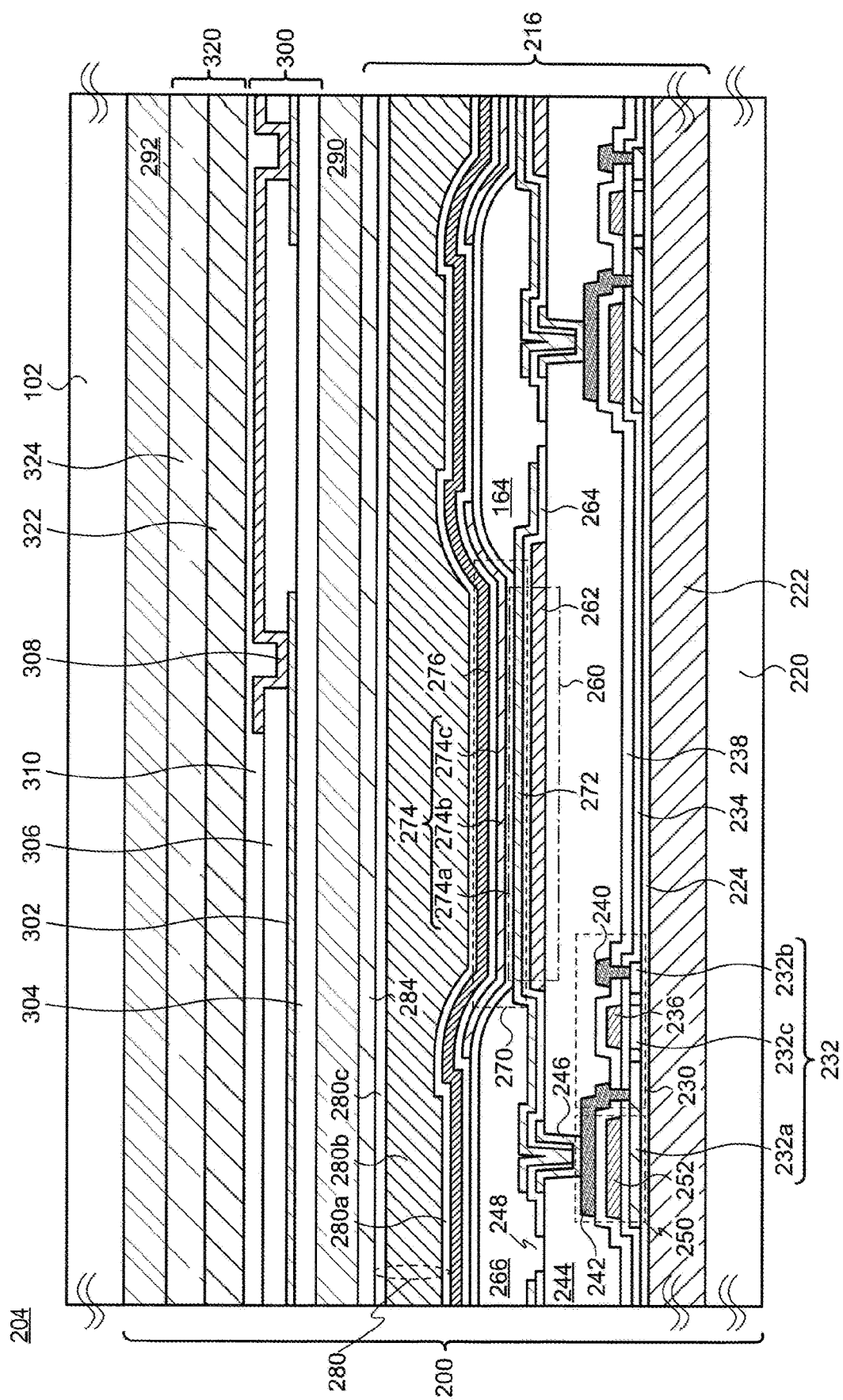
FIG. 2 is a schematic side view of a display device according to an embodiment.

A structure of the pixel 204 is explained by using a schematic cross-sectional view shown in FIG. 2. The cross-sectional structure of two adjacent pixels 204 are illustrated in FIG. 2. Although a driving transistor 230, a storage capacitor 250, a supplementary capacitor 260, and a light-emitting element 270 as a display element in each pixel 204 are illustrated here, a circuit structure of the pixel 204 may be arbitrarily selected and the numbers of the transistors and capacitors are not limited. Additionally, the display element is not limited to the light-emitting element 270, and a liquid crystal element may be employed.

The display panel 200 has a substrate 222 over which the driving transistor 230 and the storage capacitor 250 are arranged through an undercoat 224. The driving transistor 230 includes a semiconductor film 232, a gate insulating film 234, and a gate electrode 236, and source/drain electrodes 240 and 242. The gate electrode 236 is arranged to intersect at least a part of the semiconductor film 232 with the gate insulating film 234 sandwiched therebetween, and a channel 232c is formed in a region where the semiconductor film 232 and the gate electrode 236 overlap with each other. The semiconductor film 232 further possesses source/drain regions 232a and 232b sandwiching the channel 232c.

A capacitor electrode 252 existing in the same layer as the gate electrode 236 is disposed so as to overlap with the source/drain electrode 232a with the gate insulating film 234 sandwiched therebetween. An interlayer insulating film 238 is formed over the gate electrode 236 and the capacitor electrode 252. Openings reaching the source/drain regions 232a and 232b are formed in the interlayer insulating film 238 and the gate insulating film 234, and the source/drain electrodes 240 and 242 are arranged so as to cover the openings. A part of the source/drain electrode 242 overlaps with a part of the source/drain region 232a and the capacitor electrode 252 through the interlayer insulating film 238, and the storage capacitor 250 is structured by the part of the source/drain electrode 232a, the gate insulating film 234, the capacitor electrode 252, the interlayer insulating film 238, and the part of the source/drain electrode 242.

A leveling film 244 is further formed over the driving transistor 230 and the storage capacitor 250. The leveling film 244 has an opening reaching the source/drain electrode 242, and a connection electrode 246 covering this opening and a part of a top surface of the leveling film 244 is disposed so as to be in contact with the source/drain electrode 242. A supplementary capacitor electrode 262 is further provided over the leveling film 244. A capacitor insulating film 264 is formed so as to cover the connection electrode 246 and the supplementary capacitor electrode 262. The capacitor insulating film 264 exposes a top surface of the connection electrode 246 without covering a part of the connection electrode 246 in the opening of the leveling film 244. This structure enables an electrical connection between a pixel electrode (first electrode) 272 of the light-emitting element 270 formed over the connection electrode 246 and the source/drain electrode 242 via the connection electrode 246. An opening 248 may be formed in the capacitor insulating film 264 to allow contact between a partition wall 266 formed over the capacitor insulating film 264 and the leveling film 244. Impurities in the leveling film 244 can be removed through the opening 248, thereby improving reliability of the light-emitting element 270. Note that the formation of the connection electrode 246 and the opening 248 is optional.

The pixel electrode 272 is formed over the capacitor insulating film 264 so as to cover the connection electrode 246 and the supplementary capacitor electrode 262. The capacitor insulating film 264 is sandwiched by the supplementary capacitor electrode 262 and the pixel electrode 272, and the supplementary capacitor 260 is formed by this structure.

The partition wall 266 covering an edge portion of the pixel electrode 272 is formed over the pixel electrode 272. An EL layer 274 and an opposing electrode 276 thereover are disposed so as to cover the partition wall 266.

The EL layer 274 may be composed of a plurality of layers and is formed by combining a variety of functional layers such as a carrier-injection layer, a carrier-transporting layer, an emission layer, a carrier-blocking layer, an exciton-blocking layer, and the like, for example. The structure of the EL layer 274 may be the same in all of the pixels 204, or the EL layer 274 may be configured so that a part of the structure is different between adjacent pixels 204. A hole-transporting layer 274a, an emission layer 274b and an electron-transporting layer 274c are illustrated as the typical functional layers in FIG. 2.

A protection film (hereinafter, referred to as a passivation film) 280 is arranged over the light-emitting elements 270 for protecting the light-emitting elements 270. A structure of the passivation film 280 may be arbitrarily selected, and a stacked-layer structure including a first layer 280a containing an inorganic compound, a second layer 280b containing an organic compound, and a third layer 280c containing an inorganic compound may be applied as shown in FIG. 2.

A film (hereinafter, referred to as a resin mask) 284 including a resin is disposed over the passivation film 280. In the specification and claims, a stacked body composed of the substrate 222, the resin mask 284, and a variety of films formed therebetween is defined as the display layer 216.

2-2. Touch Sensor

The display device 100 has the touch sensor 300 over the resin mask 284 with a first adhesive film 290 sandwiched therebetween. A variety of adhesives such as epoxy-based, acrylic-based, poly(vinyl acetate)-based, and silicon-based adhesives can be used for the first adhesive film 290. The first adhesive film 290 may be formed by applying and curing a fluid adhesive, or a film-shaped adhesive in which an adhesive is applied on both surfaces of a film may be used. The adhesion mode is also not limited, and adhesion modes such as a two-component mixing type mode, a one-component moisture-curing type mode, a light-curing type mode, and a thermosetting type mode may be applied.

The touch sensor 300 is fixed over the display region 202 with the first adhesive 290 so as to overlap with the display region 202. The touch sensor 300 includes, as main components, a base material 304, a plurality of touch electrodes 302 over the base material 304, an interlayer insulating film 306 over the touch electrodes 302, bridge electrodes 308 formed over the interlayer insulating film 306 and electrically connecting the adjacent touch electrodes 302, and an overcoat 310 disposed over the bridge electrodes 308. The base material 304 has a function to provide physical strength to the touch sensor 300 and includes a polymer. A polycarbonate, a polyester, a polyolefin, a polycycloolefin, and their derivatives are exemplified as a polymer. The touch electrodes 302 and the bridge electrodes 308 may include a conductive oxide capable of transmitting visible light, such as indium-tin oxide (ITO) and indium-zinc oxide (IZO) or a metal such as copper, aluminum, molybdenum, tungsten, and tantalum. In the example shown here, the touch sensor 300 is demonstrated as a touch sensor with a projection-type electrostatic capacitance mode. However, the mode for detecting a touch in the touch sensor 300 is not limited, and touch sensors with a variety of modes can be employed.

2-3. Polarizing Plate

The polarizing plate 320 is provided over the touch sensor 300 through an adhesive film which is not illustrated so as to overlap with the display region 202. The polarizing plate 320 possesses a retardation film 322 and a polarizer 324 as main components. The retardation film 322 includes a polymer having high transparency in visible region, such as a polycarbonate, poly(vinyl alcohol), a poly(acrylic ester), and a poly(ether sulfone) which are uniaxially stretched. The retardation film 322 may be structured with a plurality of films. In this case, the plurality of films may contain different polymers.

The polarizer 324 is a film containing poly(vinyl alcohol) and iodine or dichroic dye adsorbed to the poly(vinyl alcohol). This film is uniaxially stretched, and the adsorbed iodine or dichroic dye is oriented in one direction. Although not illustrated, films including a cellulose-based polymer functioning as a protection film may be arranged over and under the polarizer 324. Moreover, an adhesive film may be disposed for adhering the protection film and the retardation film 322.

Note that an area of the first adhesive film 290 is adjusted to be larger than the areas of the touch sensor 300 and the polarizing plate 320.

2-4. Other Structure

The opposing substrate 102 is formed over the polarizing plate 320 through a second adhesive 292. An adhesive usable for the first adhesive film 290 can be used as the second adhesive film 292. In addition, a lamination film 220 including a polymer such as a polyester and a polycarbonate may be formed under the substrate 222 in order to provide physical strength to the display device 100 and make handling of the display device 100 easy. In the present specification and claims, a stacked body of the substrate 222, the second adhesive 292, and a variety of films sandwiched therebetween is defined as the display panel 200. The display panel 200 may include the lamination film 220.

The undercoat 224, the gate insulating film 234, the interlayer insulating film 238, the capacitor insulating film 264, the first layer 280a, and the third layer 280c are each an insulating film and may include a film including a silicon-containing inorganic compound such as silicon nitride, silicon oxide, silicon oxynitride, and silicon nitride oxide. Films including a silicon-containing inorganic compound may by stacked in each of these insulating films. Therefore, these insulating films include an inorganic compound containing silicon as a main structural element.

The substrate 222 includes an aromatic polyimide or polyamide having relatively high thermal resistivity. The leveling film 244, the second layer 280b, the resin mask 284, and the like include a polymer selected from an epoxy resin, an acrylic resin, a polysiloxane, and the like.

3. Structure of Edge Portion 3-1. Structure of Long Side

Figure 3:
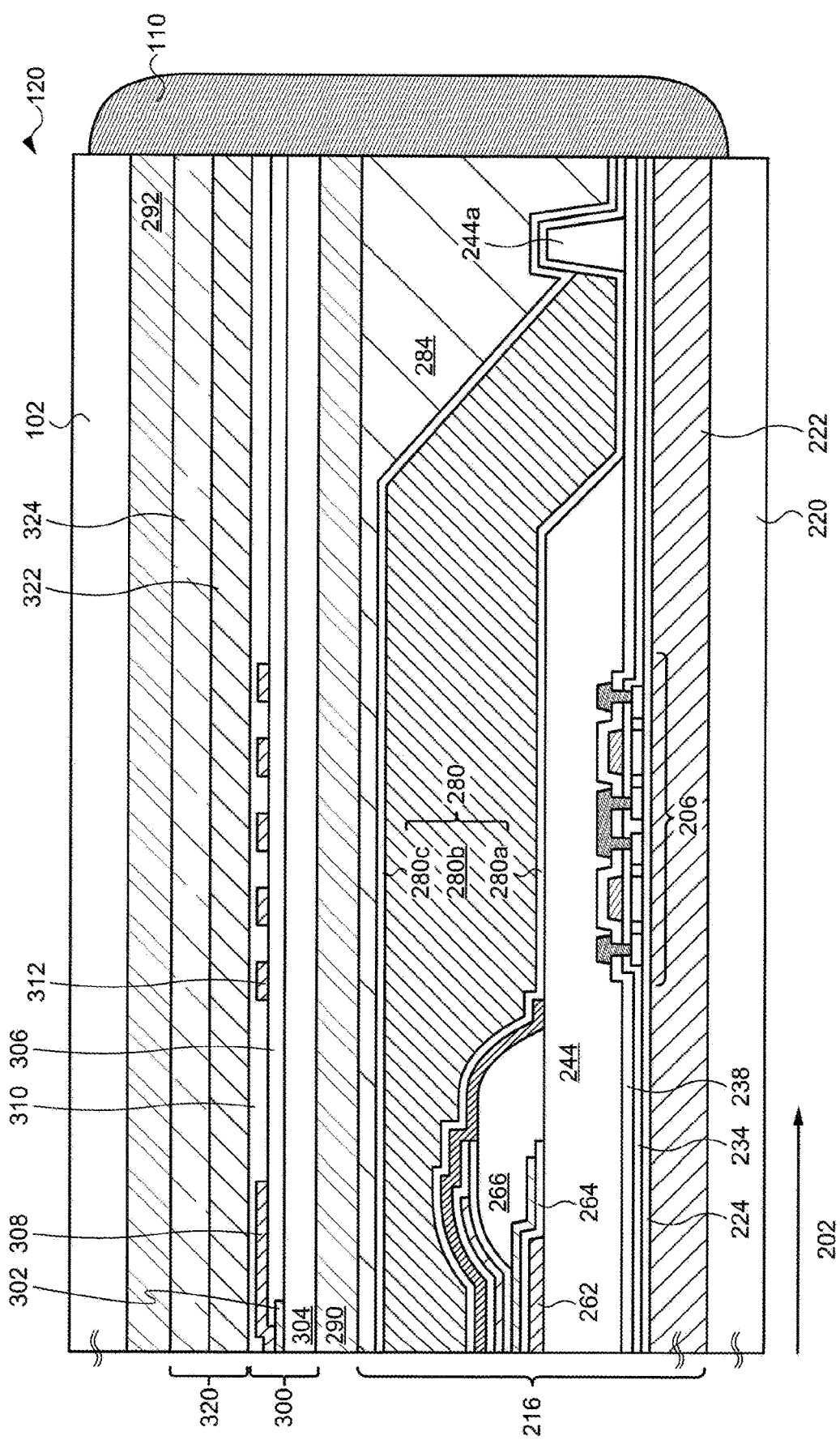
FIG. 3 is a schematic side view of a display device according to an embodiment.

A structure of the edge portion of the display device 100 is schematically shown in FIG. 3. As shown in FIG. 1A and FIG. 1B, the scanning-line driver circuits 206 are formed along the first side 120 and the second side 122 of the display device 100. FIG. 3 is a cross-sectional view including an edge portion of the display region 202 and the first side 120.

The scanning-line driver circuit 206 is formed in the region between the display region 202 and the first side 120, that is, in the frame region. Although a transistor structuring a part of the scanning-line driver circuit 206 is illustrated in FIG. 3, the scanning-line driver circuit 206 may include a variety of semiconductor elements.

The leveling film 244 is partly removed in the frame region, by which a part of the leveling film 244 forms a dam 244a. That is, there is a region in which the leveling film 244 does not exist between the display region 202 and the dam 244a, and the layers including an inorganic compound, such as the first layer 280a and the interlayer insulating film 238, are in contact with each other. The dam 244a has a function to restrict the region in which the second layer 280b is to be formed. That is, the dam 244a functions as a barrier for preventing the second layer 280b from being formed in the region between the dam 244a and the first side 120.

Similar to the cross-sectional structure of the pixel 204, the resin mask 284, the first adhesive film 290, the touch sensor 300, the polarizing plate 320, the second adhesive film 292, and the opposing substrate 102 are disposed over the passivation film 280. Wirings 312 are formed over the interlayer insulating film 306 of the touch sensor 300 to supply signals to the touch electrodes 302.

Here, a sealing material 110 is provided at the edge portion of the display device 100 as shown in FIG. 3. The sealing material 110 is structured by a material with a high damp-proofing property, and a moisture permeability under the conditions that temperature is 40° C. and humidity is 90%, is equal to or larger than 30 g/m$^2$·24 h and equal to or smaller than 80 g/m$^2$·24 h or equal to or larger than 40 g/m$^2$·24 h and equal to or smaller than 60 g/m$^2$·24 h, and typically 50 g/m$^2$·24 h. The sealing material 110 includes a polymer, and there is no limitation to a fundamental skeleton thereof. For example, a polymer may be a novolak resin, a silicon resin, a phenol resin, or a resin having polystyrene as a fundamental skeleton. A resin may be intramolecularly or intermolecularly cross-linked. In addition, the sealing material 110 may be a photo-curable type or thermos-setting type resin.

Although side surfaces of the variety of films are exposed from the display device 100 on the first side 120, the sealing material 110 may cover at least a side surface of the polarizing plate 320. For example, the sealing material 110 may be provided so as to cover a side surface of the lamination film 220, a side surface of the display layer 216 (i.e., side surfaces of the substrate 222, the undercoat 224, the gate insulating film 234, the interlayer insulating film 238, the first layer 280a, the third layer 280c, and the resin mask 284), a side surface of the first adhesive film 290, a side surface of the touch sensor 300 (i.e., side surfaces of the base material 304 and the interlayer insulating film 306), the side surface of the polarizing plate 320 (i.e., side surfaces of the retardation film 322 and the polarizer 324), a side surface of the second adhesive film 292, and a side surface of the opposing substrate 102 as shown in FIG. 3.

Figure 4A:
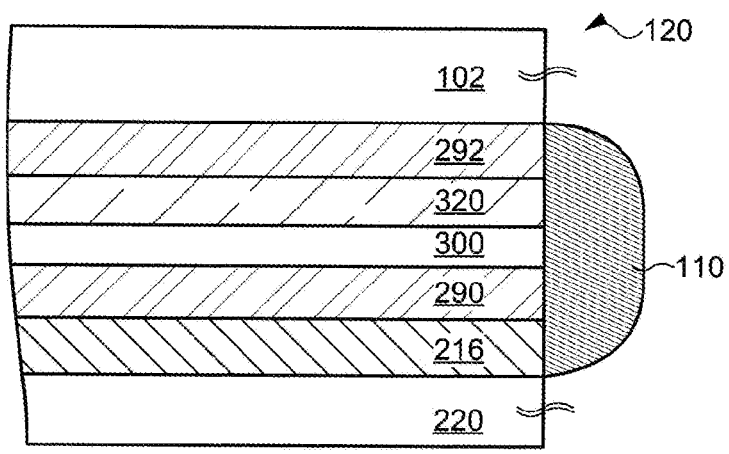
FIG. 4A to FIG. 4C are schematic cross-sectional views of a display device according to an embodiment.

Alternatively, the sealing material 110 may be formed so as not to cover the side surfaces of the lamination film 220 and the opposing substrate 102 but to cover the side surfaces of the display layer 216, the first adhesive film 290, the touch sensor 300, the polarizing plate 320, and the second adhesive film 292 as schematically shown in FIG. 4A.

Figure 4B:
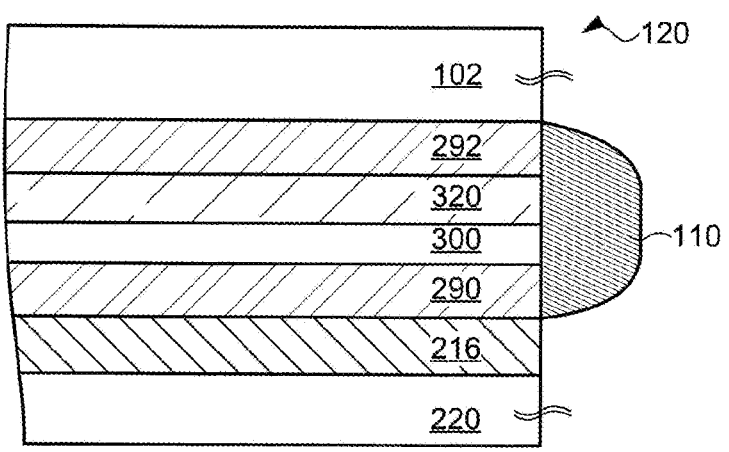

Alternatively, the sealing material 110 may be formed so as not to cover the side surfaces of the lamination film 220, the opposing substrate 102, and the display layer 216 but to cover the side surfaces of the first adhesive film 290, the touch sensor 300, the polarizing plate 320, and the second adhesive film 292 as shown in FIG. 4B.

Figure 4C:
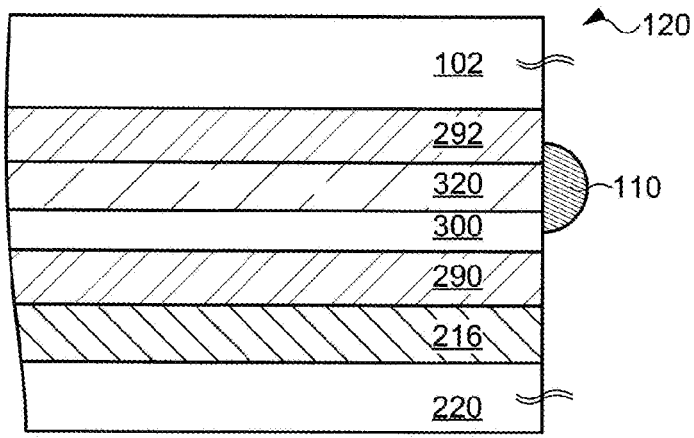

Alternatively, the sealing material 110 may be formed so as to cover the side surface of the polarizing film 320 as well as a part of the side surfaces of the touch sensor 300 and the adhesive film 292 respectively located under and over the polarizing plate 320 as shown in FIG. 4C.

Figure 5A:
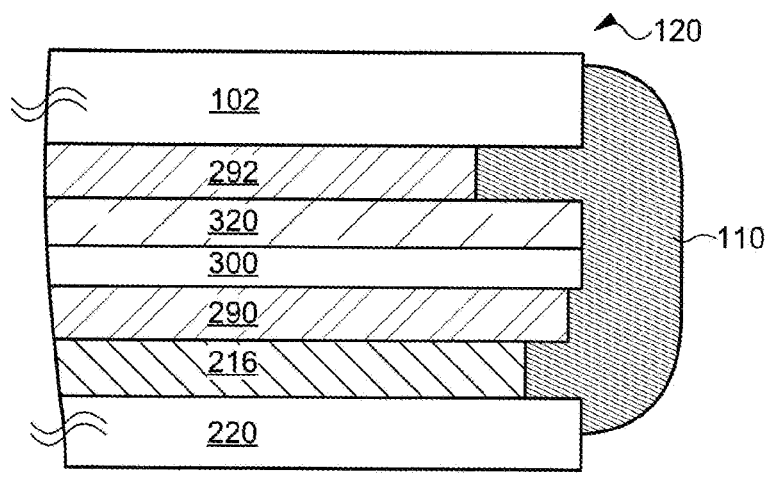
FIG. 5A and FIG. 5B are schematic cross-sectional views of a display device according to an embodiment.
Figure 5B:
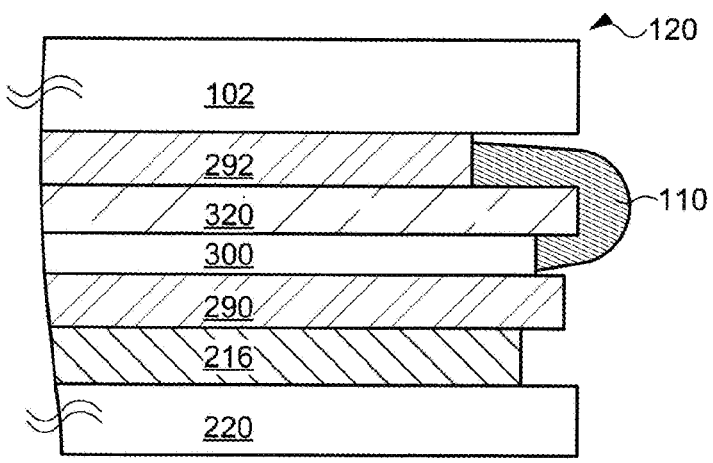

As described above, the touch sensor 300, the polarizing plate 320, and the opposing substrate 102 are fixed over the display region 202 by using the adhesive films exemplified by the first adhesive film 290 and the second adhesive film 292. Therefore, the side surfaces of the display layer 216, the touch sensor 300, the polarizing plate 320, and the opposing substrate 102 do not always match one another and may not be coplanar as shown in FIG. 5A. In such a case, the sealing material 110 may be formed so as to cover not only the side surfaces of the lamination film 220, the display layer 216, the first adhesive film 290, the touch sensor 300, the polarizing plate 320, the second adhesive film 292, and the opposing substrate 102 but also a part of the top surfaces and a part of the undersurfaces thereof. For instance, the sealing material 110 covers a part of the top surface of the polarizing plate 320 in the example shown in FIG. 5A. In contrast, the sealing material 110 covers a part of the top surface and a part of the undersurface of the polarizing plate 320 as well as the side surface thereof in the example shown in FIG. 5B. The sealing material 110 is disposed so as to cover at least one of a part of the top surface and a part of the undersurface of the polarizing plate 320 as well as the side surface thereof.

Figure 6A:
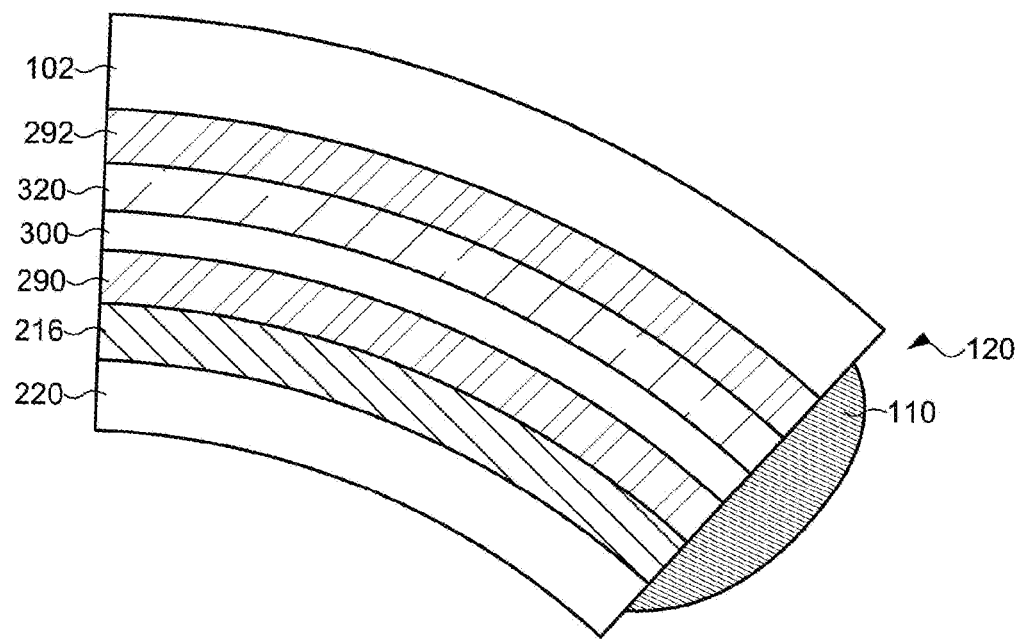
FIG. 6A and FIG. 6B are schematic cross-sectional views of a display device according to an embodiment.
Figure 6B:
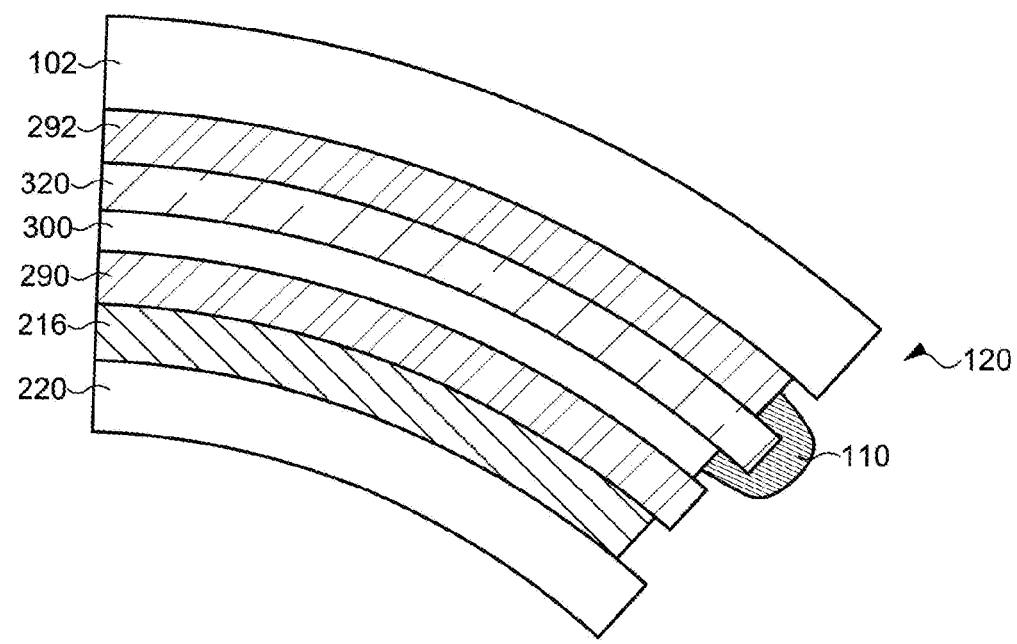

As shown in FIG. 1B, the same is applied to the case where the display device 100 has a structure in which the vicinity of the first side 120 is bent, and the sealing material 110 is formed so as to cover the side surfaces of the lamination film 220, the display layer 216, the first adhesive film 290, the touch sensor 300, the polarizing plate 320, the second adhesive film 292, and the opposing substrate 110 as shown in FIG. 6A. In addition, the sealing material 110 covers at least the side surface of the polarizing plate 320 as shown in FIG. 6B. When all of the side surfaces of these films do not match one another, the sealing material 110 is disposed so as to cover at least one of the top surface and the undersurface of the polarizing plate 320 as well as the side surface thereof.

Although not illustrated, the sealing material 110 is formed in a similar way at the edge portions on the second side 122 and the third side 124 of the display device 100.

3-2. Structure of Short Side

Figure 7:
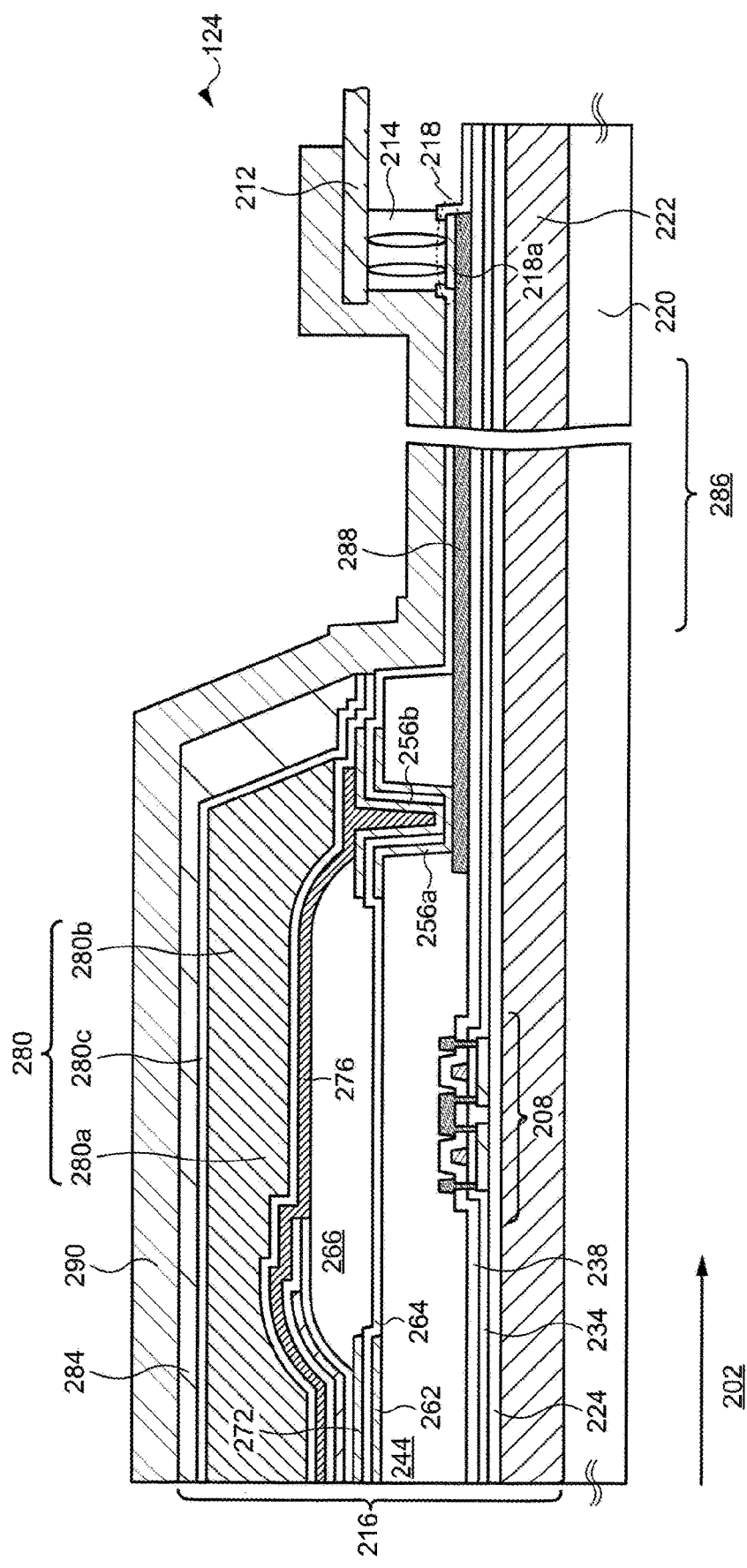
FIG. 7 is a schematic cross-sectional view of a display device according to an embodiment.

A cross-sectional structure at the vicinity of the third side 124 of the display device 100 is schematically shown in FIG. 7. FIG. 7 shows the structure of the edge portion of the display region 202, the third side 124, and a region therebetween. Note that the structures formed on the side of the opposing substrate 102 from the first adhesive film 290 are omitted for visibility.

The signal-line driver circuit 208 is formed in the frame region between the display region 202 and the third side 124. Although a transistor structuring a part of the signal-line driver circuit 208 is shown in FIG. 7, the signal-line driver circuit 208 may include a variety of semiconductor elements.

The opposing electrode 276 extends from the display region 202 to the third side 124 of the substrate 222 and is electrically connected to a wiring 288 in an opening formed in the leveling film 244. Specifically, the leveling film 244 has the opening reaching the wiring 288, and a contact electrode 256 including a first contact electrode 256a and a second contact electrode 256b over the first contact electrode 256a is arranged so as to cover this opening. The opposing electrode 276 is electrically connected to the wiring 288 through the second contact electrode 256b and the first contact electrode 256a.

The wiring 288 further forms a terminal 218 at the vicinity of the third side 124. A surface of the terminal 218 may be covered with a protection electrode 218a existing in the same layer as the first contact electrode 256a. The connector 212 covers the terminal 218 and is electrically connected to the terminal 218 with a conductor such as an anisotropic conductive film 214. A constant potential is supplied to the opposing electrode 276 through the terminal 218 and the connector 212. Note that the region of the frame region between the contact electrode 256 and the terminal 218 is called a wiring region 286.

The passivation film 280 is formed to cover the display region 202 over which the resin mask 284 is formed. The resin mask 284 is disposed for patterning the first layer 280a and the third layer 280c of the passivation film 280 and exposing the protection electrode 218a. The touch sensor 300 and the like which are not illustrated are fixed over the resin mask 284 with the first adhesive film 290 sandwiched therebetween. Although not illustrated, the polarizing plate 320, the second adhesive film 292, and the opposing substrate 102 are arranged over the touch sensor 300. Here, the first adhesive film 290 is formed not only over the display region 202 but also over the wiring 288 and the connector 212.

Figure 8:
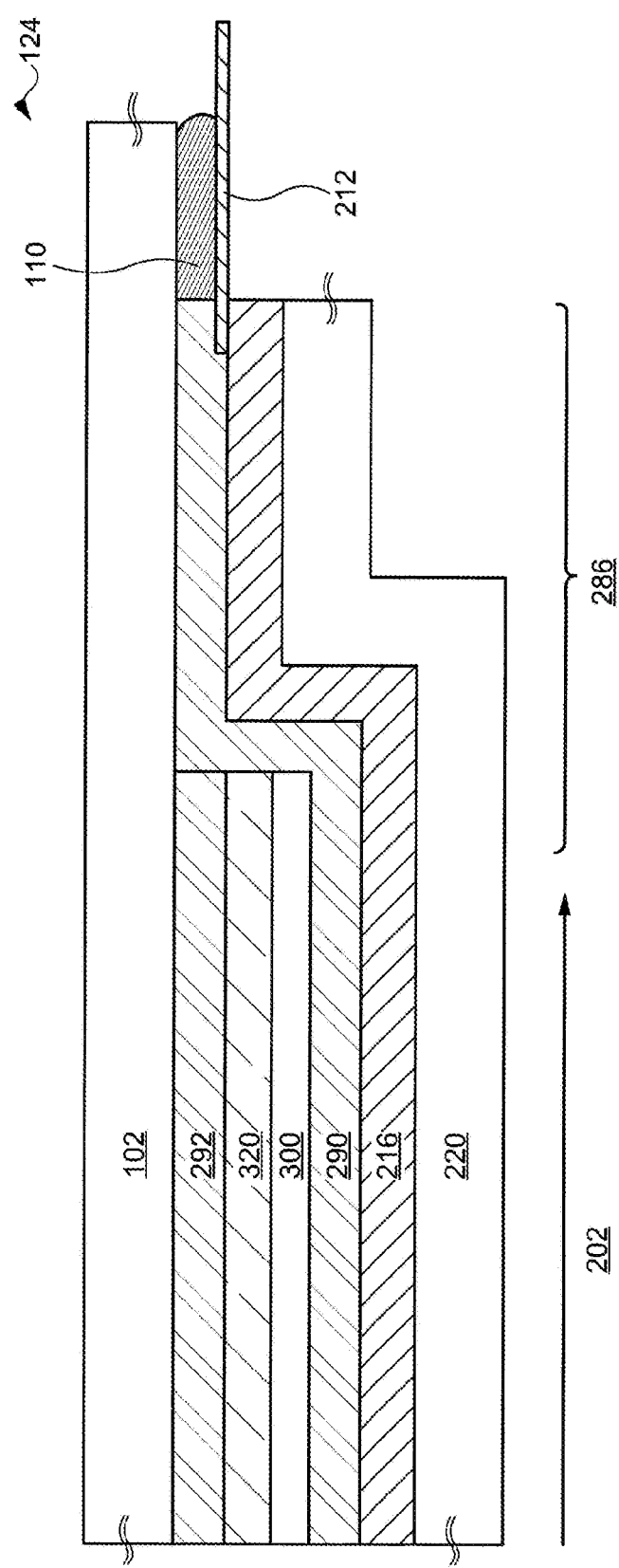
FIG. 8 is a schematic cross-sectional view of a display device according to an embodiment.

Similar to the first side 120, the sealing material 110 is disposed at the edge portion on the third side 124. Specifically, the sealing material 110 is formed so as to cover the side surface of the first adhesive film 290 and a part of a top surface of the connector 212 as shown in FIG. 8. The sealing material 110 may be in contact with the undersurface of the opposing substrate 102. The sealing material 110 can be formed by injecting, with a syringe or the like, the sealing material 110 which has not been subjected to curing to a space formed by the top surface of the connector 212, the side surface of the first adhesive film 290, and the undersurface of the opposing substrate 102, followed by curing the sealing material 110.

Here, as described above, the first adhesive film 290 is formed so as to have a larger area than the touch sensor 300 and the polarizing plate 320. Moreover, the first adhesive film 290 is partly bent in the wiring region 286 so as to cover the side surfaces of the touch sensor 300, the polarizing plate 320, and the second adhesive film 292 which are formed to overlap with the display region 202. As a result, the first adhesive film 290 can be in contact with the undersurface of the opposing substrate 102 in addition to the side surfaces of the touch sensor 300, the polarizing plate 320, and the first adhesive film 290. Note that, in the case where a light-shielding film (also called a decorating film) is disposed so as to be in contact with the undersurface of the opposing substrate 102, the first adhesive film 290 is in contact with the light-shielding film and positioned under the opposing substrate 102 with the light-shielding film sandwiched therebetween.

Figure 9:
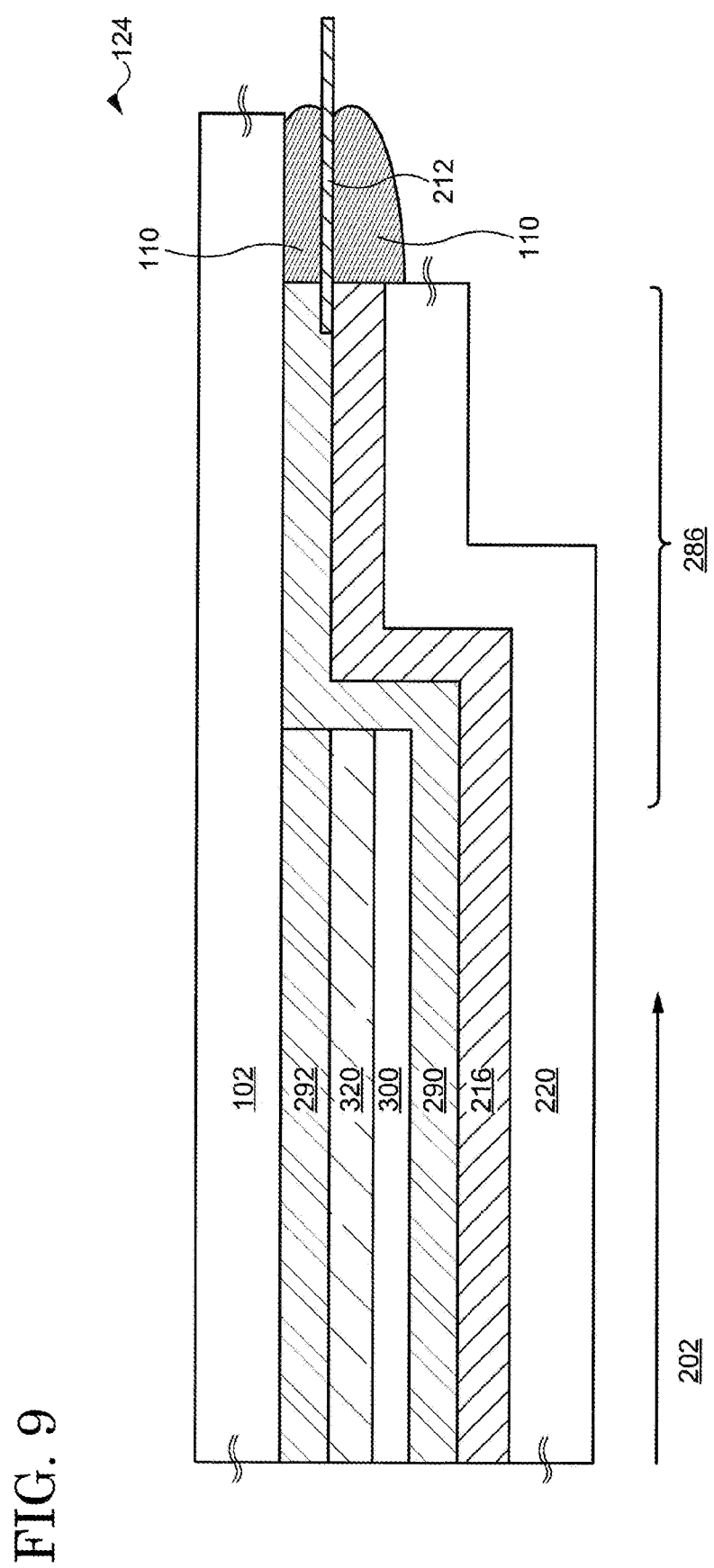
FIG. 9 is a schematic cross-sectional view of a display device according to an embodiment.

The sealing material 110 may be also formed under the connector 212. Specifically, the sealing material 110 may be disposed so as to further cover an undersurface of the connector 212 and the side surface of the display layer 216 as shown in FIG. 9. In this case, a part of the sealing material 110 may be in contact with the side surface of the lamination film 220.

As described above, the first adhesive film 290, the second adhesive film 292, the base material 304 of the touch sensor 300, the retardation film 322, and the polarizer 324 include a polymer. A polymer is one type of organic compound and has hydrophilicity higher than that of an inorganic compound including silicon, such as silicon nitride and silicon oxide.

The top surfaces of these films are covered by the opposing substrate 102, and the undersurfaces thereof are supported by the passivation film 280 located in the display layer 216 and include an inorganic compound. Therefore, a probability that water enters from over and under these films is low. However, the side surfaces of these films are exposed to the atmosphere as shown in FIG. 10A if the sealing material 110 is not disposed because these films are located on the first side 120 to the fourth side 126 of the display device 100.

Figure 10A:
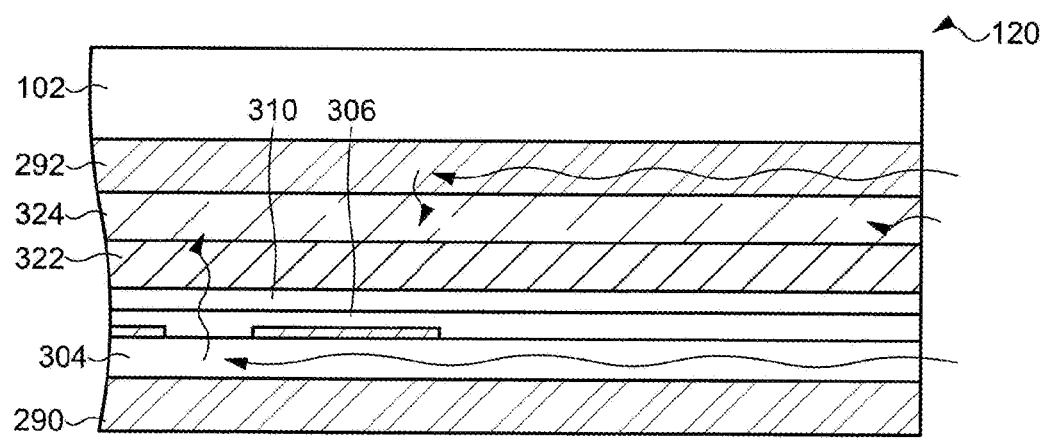
FIG. 10A and FIG. 10B are schematic cross-sectional views of a display device according to an embodiment.

In such a case, impurities such as water included in the atmosphere or oxygen or the like dissolved in water enter from the side surfaces of these films, and these polymer-containing films serve as a diffusion route of the impurities (see curved arrows in FIG. 10A). If the impurities diffuse to the polarizer 324, iodine and the dichroic dye disappear, and the function as the polarizing plate 320 is lost (dye elimination). Accordingly, it becomes impossible to control orientation of light and suppress reflection of ambient light, and a malfunction that the variety of conductive films and wirings (e.g., touch electrodes 302 and the like) disposed in the display layer 216 and the touch sensor 300 become visible from the outside through the polarizing plate 320 is also caused. Hence, an unnecessary pattern is mixed to an image provided on the display region 202, resulting in a significant decrease of image quality.

Figure 10B:
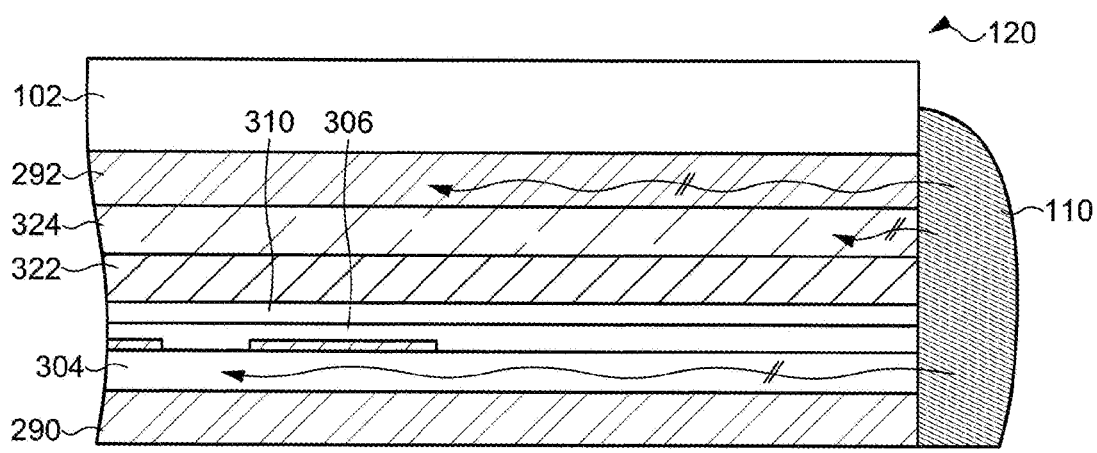

However, the sealing material 110 is formed so as to cover the side surface of the polarizing plate 320 and at least one of the top surface and the undersurface of the polarizing plate 320 in the display device 100. Furthermore, the sealing material 110 may further cover the side surfaces of other films exemplified by not only the display layer 216, the touch sensor 300, and the second adhesive film 292, but also the lamination film 220 and the opposing substrate 102. Hence, the diffusion route of impurities shown in FIG. 10A can be interrupted (see FIG. 10B), the dye elimination can be prevented, and the function of the polarizing plate 320 can be maintained for a long time. Therefore, implementation of the present embodiment allows production of a display device with high reliability.

Second Embodiment

In the First Embodiment, the sealing material 110 covers not only the side surface of the polarizing plate 320 but also at least one of a part of the top surface and a part of the undersurface of the polarizing plate 320 on the first side 120, the second side 122, and the fourth side 126 of the display device 100. In contrast, the first adhesive film 290 covers the side surfaces of the touch sensor 300, the polarizing plate 320, and the second adhesive film 292 on the third side 124.

Figure 11A:
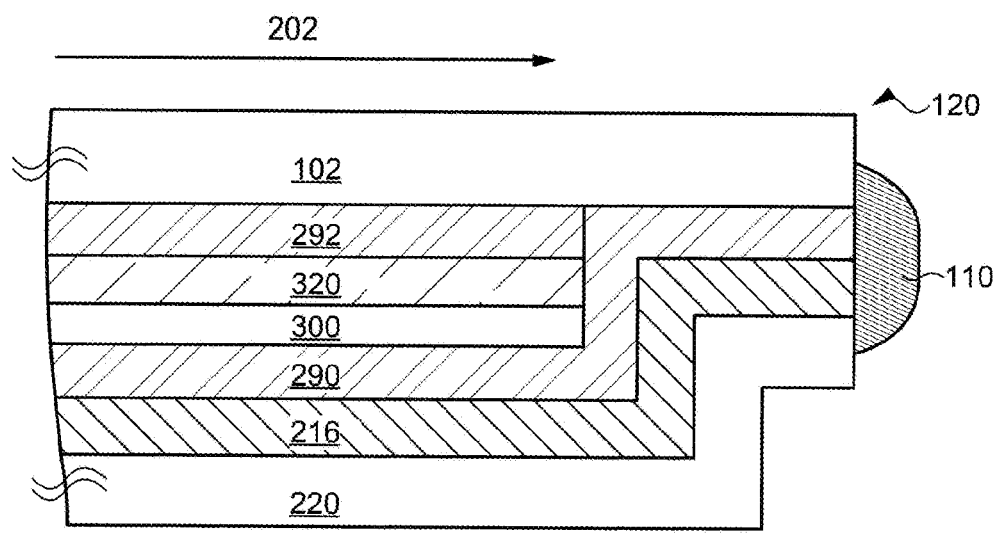
FIG. 11A and FIG. 11B are schematic cross-sectional views of a display device according to an embodiment.

In the present embodiment, the display device 100 is configured so that the first adhesive film 290 covers the side surfaces of the touch sensor 300, the polarizing plate 320, and the second adhesive film 292 not only on the third side 124 but also on the first side 120, the second side 122, and the fourth side 126. Specifically, the first adhesive film 290 is partly bent in the frame region so as to cover the side surfaces of the touch sensor 300, the polarizing plate 320, and the second adhesive film 292 on the first side 120, the second side 122, and the fourth side 126 as shown in FIG. 11A. The first adhesive film 290 is in contact with the undersurface of the opposing substrate 102. However, when a decorating film which is not illustrated is disposed on the undersurface of the opposing substrate 102, the decorating film is sandwiched by the opposing substrate 102 and the first adhesive film 290. The display layer 216 and the lamination film 220 are also bent to match the shape of the first adhesive film 290.

Figure 11B:
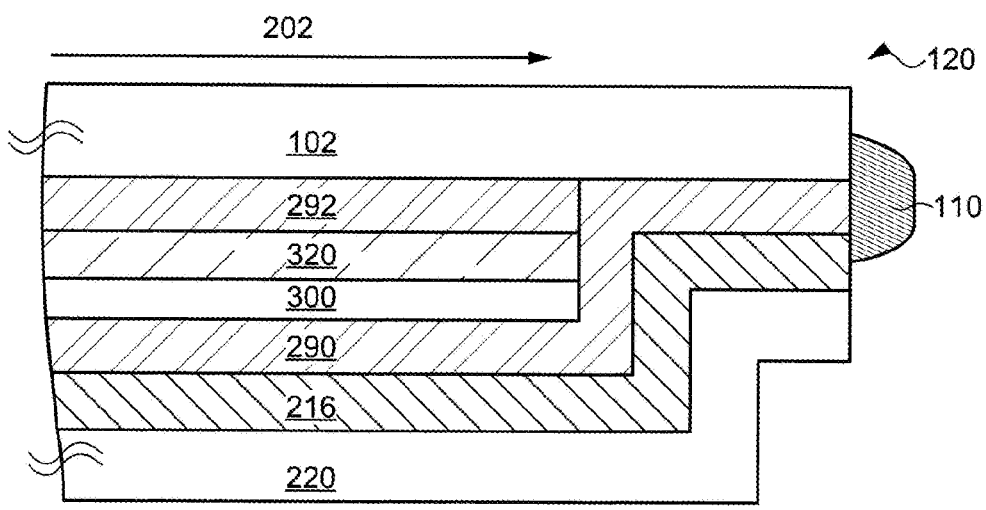

The sealing material 110 may be disposed so as to cover the side surfaces of the lamination film 220, the display layer 216, the first adhesive film 290, and the opposing substrate 102 as shown in FIG. 11A. Alternatively, the sealing film 110 may be formed so as to cover the side surface of the first adhesive film 216, a part of the side surface of the display layer 216, and a part of the side surface of the opposing substrate 102 in view of the high hydrophilicity of the first adhesive film 290 (FIG. 11B). With these structures, it is possible to prevent exposure of the interface between the first adhesive film 290 and the display layer 216 and the interface between the first adhesive film 290 and the substrate 102.

Application of such structures prevents entrance of impurities from the side surface of the first adhesive film 290. Furthermore, the diffusion route of impurities is increased because a distance from the polarizing plate 320 to the first side 120, the second side 122, or the fourth side 126 is increased. As a result, it is also possible to suppress a decrease of the function of the polarizing plate 320 due to impurities, which allows production of a display device with high reliability.

Third Embodiment

In the present embodiment, a display device 130 different in structure from the display device 100 is explained. An explanation of the structures the same as or similar to those in the First and Second Embodiments may be omitted.

Figure 12:
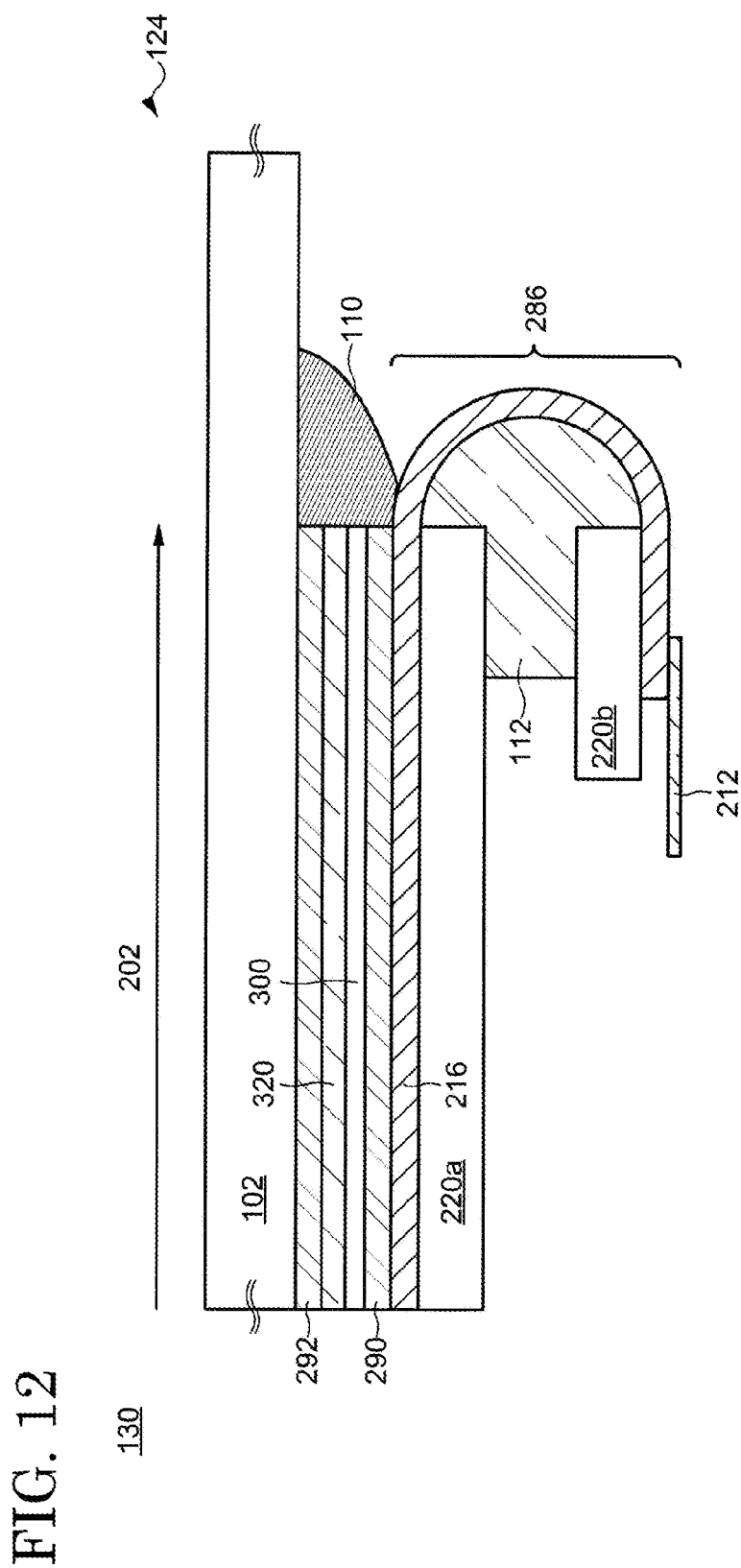
FIG. 12 is a schematic cross-sectional view of a display device according to an embodiment.

A difference between the display device 130 and the display device 100 is that the display layer 216 is folded in the wiring region 286 as shown in FIG. 12. Here, the terminals 218 connected to the pixels 204 and the connector 212 are formed over the substrate 222 of the display layer 216 (i.e., on the side of the opposing substrate 102) (see FIG. 7). Therefore, in the display device 130, the substrate 222 is folded so that the substrate 222 is distanced from the opposing substrate 102 and the pixels 204 are located between the terminals 218 and the opposing substrate 102.

A part of the lamination film 220 is removed in the wiring region 286 so as to be separated into lamination films 220a and 220b in order to enhance flexibility of the wiring region 286 to be folded. The lamination film 220a overlaps with the display region 202, while the lamination film 220b overlaps with the terminals 218 and the connector 212. A spacer 112 may be disposed in order to stabilize the shape of the folded portion. The spacer 112 has a curved surface which matches the shape of the wiring region 286 and is fixed to the lamination films 220a and 220b with an adhesive which is not illustrated.

Figure 13:
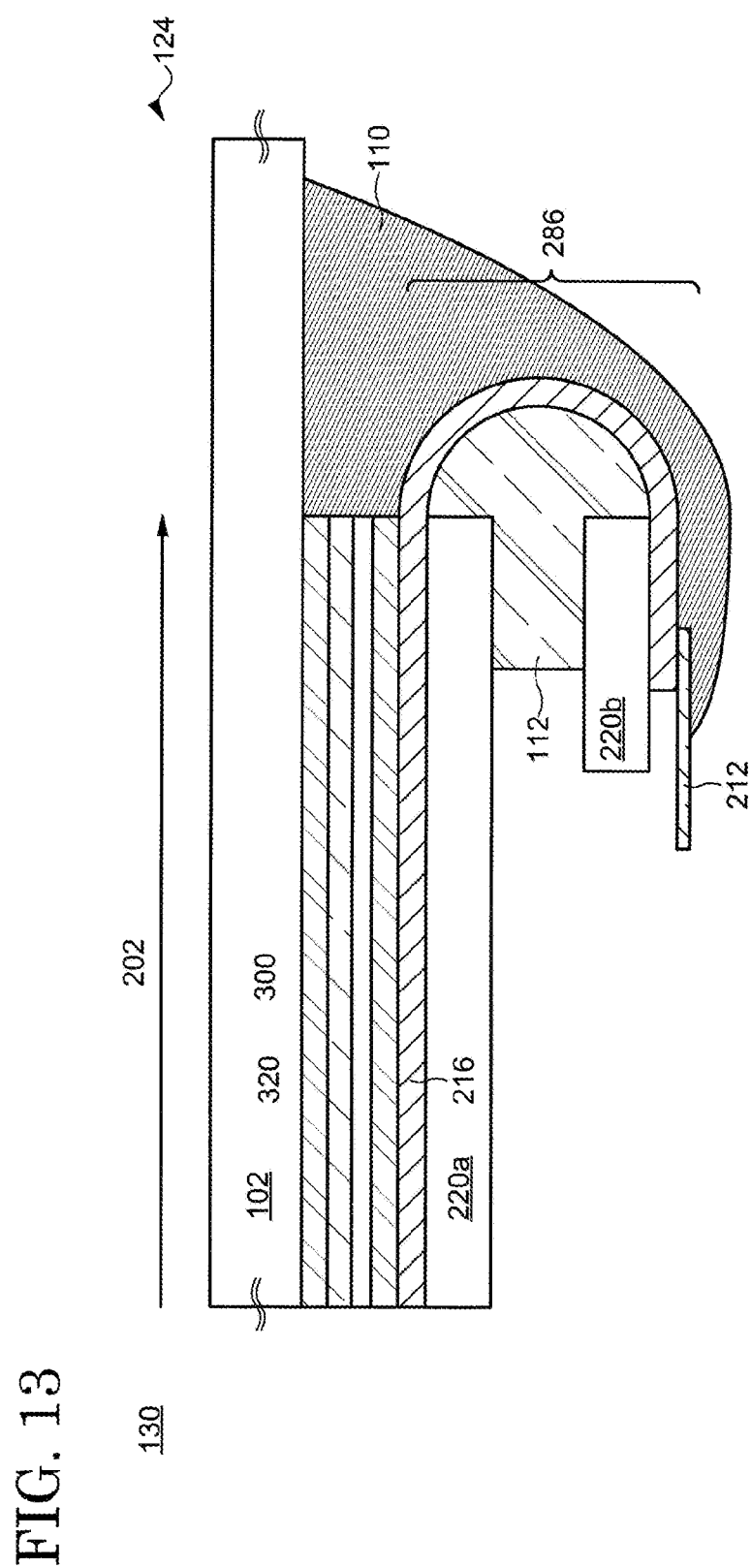
FIG. 13 is a schematic cross-sectional view of a display device according to an embodiment.

The sealing material 110 may be provided so as to cover the side surfaces of the first adhesive film 290, the touch sensor 300, the polarizing plate 320, and the second adhesive film 292 (FIG. 12). At this time, the sealing material 110 may be in contact with a part of the top surface of the opposing substrate 102 and a part of the top surface of the display layer 216 (i.e., a top surface of the resin mask 284). Alternatively, the sealing material 110 may be disposed so as to cover the whole top surface of the bent region of the display layer 216 and a part of the top surface of the connector 212 as shown in FIG. 13.

Application of these configurations reduces the apparent area of the wiring region 286 and enables the connector 212 to be arranged on a back surface of the display device 130. Hence, an area occupied by the display region 202 relatively increases in a plane view, by which a more miniaturized display device or a highly reliable display device with high designability can be produced.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

In the specification, although the cases of the organic EL display device are exemplified, the embodiments can be applied to any kind of display devices of the flat panel type such as other self-emission type display devices, liquid crystal display devices, and electronic paper type display device having electrophoretic elements and the like. In addition, it is apparent that the size of the display device is not limited, and the embodiment can be applied to display devices having any size from medium to large.

It is properly understood that another effect different from that provided by the modes of the aforementioned embodiments is achieved by the present invention if the effect is obvious from the description in the specification or readily conceived by persons ordinarily skilled in the art.

What is claimed is:
1. A display device comprising:
a substrate;
a pixel over the substrate, the pixel comprising a display element;
a touch sensor over the pixel through a first adhesive film;
a polarizing plate over the touch sensor, the polarizing plate having a top surface, an undersurface, and a side surface between the top surface and the undersurface in a cross-sectional view and a sealing material covering a side surface of the polarizing plate and a side surface of the touch sensor, wherein the sealing material at least partially covers the top surface or the undersurface of the polarizing plate, the top surface and the undersurface of the polarizing plate are substantially parallel to a main surface of the substrate, and the side surface of the polarizing plate is substantially perpendicular to the top surface and the undersurface of the polarizing plate, the substrate has a rectangular shape having first to fourth sides, the sealing material covers the side surface of the polarizing plate, the at least one of the part of the top surface and the part of the undersurface of the polarizing plate, and the side surface of the touch sensor only on the first to third sides, and a connector on the fourth side.

2. The display device according to claim 1,
wherein the sealing material includes a polystyrene-based resin.

3. The display device according to claim 1,
wherein a moisture permeability of the sealing material is equal to or larger than 30 g/m²·24 h and equal to or smaller than 80 g/m²·24 h at a temperature of 40° C. and at a humidity of 90%.

4. The display device according to claim 1,
wherein the sealing material further covers a side surface of the touch sensor.

5. The display device according to claim 1, further comprising an opposing substrate over the polarizing plate through a second adhesive film,
wherein an edge portion of the substrate and an edge portion of the opposing substrate are bent and overlap with each other.

6. The display device according to claim 1, further comprising an opposing substrate over the polarizing plate,
wherein the substrate has flexibility, and
the opposing substrate does not have flexibility.

7. The display device according to claim 1, wherein
the sealing material further covers a side surface of the substrate, wherein
the side surface of the substrate is substantially perpendicular to the main surface of the substrate.

* * * * *